ELI B. RICE.
Improvement in Harvesters.
No. 121,005. Patented Nov. 14, 1871.
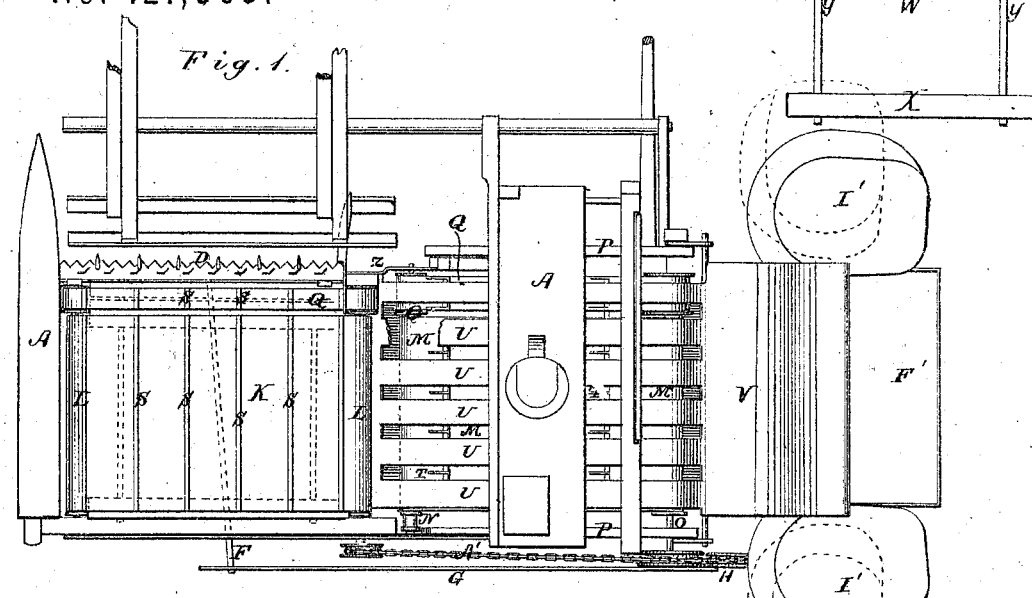
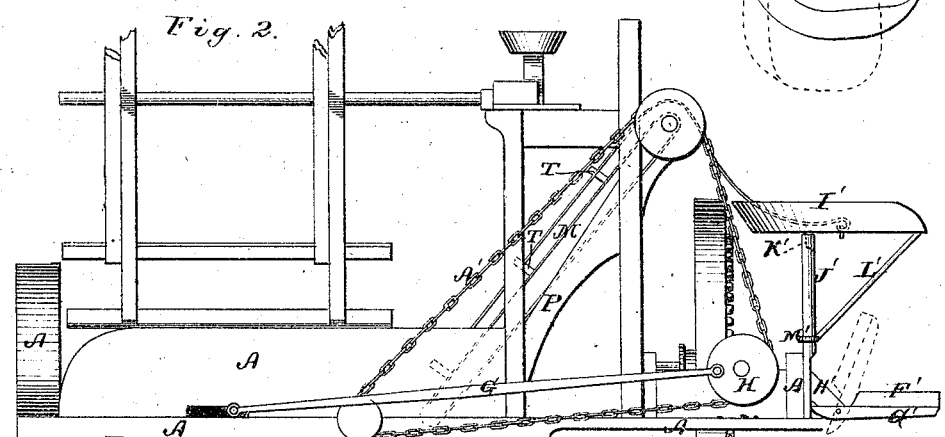
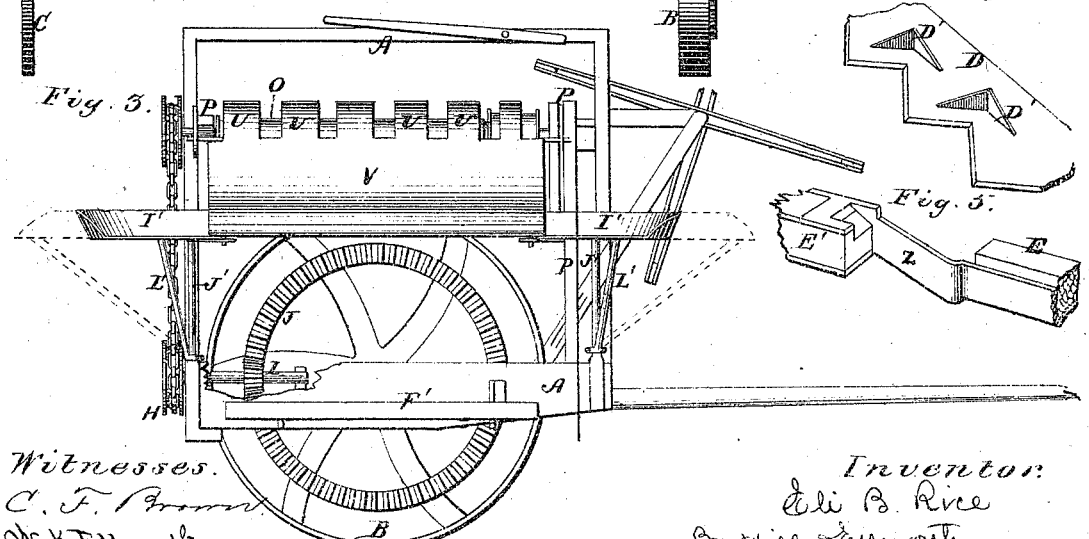
Witnesses.
C. F. Brown
W. H. Ellsworth.
Inventor:
Eli B. Rice
By Still & Ellsworth
His Attorneys.

121,005

UNITED STATES PATENT OFFICE.

ELI B. RICE, OF MADISON, WISCONSIN, ASSIGNOR OF ONE-HALF HIS RIGHT TO JOHN H. GARNHART, OF SAME PLACE.

IMPROVEMENT IN HARVESTERS.

Specification forming part of Letters Patent No. 121,005, dated November 14, 1871.

*To all whom it may concern:*

Be it known that I, ELI B. RICE, of Madison, in the county of Dane and State of Wisconsin, have invented an Improved Grain-Harvester; and I do hereby declare the following to be a full, clear, and exact description of the same, reference being had to the accompanying drawing forming part of this specification, in which—

Figure 1 is a top-plan view of a harvester, showing the application of my improvements. Figs. 2 and 3 are, respectively, rear and end elevations of the same. Fig. 4 is a detached view of a portion of the sickle. Fig. 5 is a detached view of portion of the finger-bar and main frame, showing the means by which the two are united; and Fig. 6 is a detached plan view of the frame which supports the endless apron in rear of the sickle.

Similar letters of reference in the accompanying drawing denote the same parts.

My invention has for its object to improve the construction and operation of that class of grain-harvesters in which one or more endless aprons are employed for carrying the cut grain from the sickle to a binder's table; and to this end it consists in the combination of the endless rake and elevating-aprons, the two parts of which are formed of different widths, the narrowest part being placed at the front and moving at greater speed than the rear and wider parts. By this improvement the retarding action upon the butts of the cut grain, due to the reciprocation of the sickle and to the constant accumulation of the freshly-cut grain, is overcome, and the grain delivered evenly to the binder's tables—that is to say, without being turned to an inclined position, so that the heads are carried along the aprons in advance of the butts. It further consists in the combination of a removable frame with the cutting-platform and its endless rake-apron, for the purpose of holding the upper surface of the latter in the proper position and preventing the grain from escaping between its wide and narrow parts. It consists, finally, in the construction of the binder's tables.

In the accompanying drawing, A is the general frame of the machine, mounted upon the driving-wheel B and grain-wheel C, and provided with a draft-pole, reel, and driver's seat, in the usual manner. D is the sickle, arranged upon the finger-bar E of the rake or grain-platform, and operated from the driving-wheel B in the following manner. To the rear edge of the sickle-back is pivoted a lever, F, which passes to the rear of the grain-platform, between the sides of the endless rake-apron. It is pivoted centrally to the grain-platform, and its rear end is connected, by a rod, G, to a crank-wheel, H, whose shaft has its bearings in the main frame at the right of the driving-wheel, and is provided with a pinion, I, to engage with a toothed rim, J, upon the outer face of said wheel. As the latter is rotated its motion is communicated to the lever F, which is oscillated upon its central pivot to reciprocate the sickle. K is the endless rake-apron, passing around rollers L at opposite ends of the grain-platform; and M is the elevating-apron passing around the roller N, which is arranged at the end of the main frame parallel to the inner roller L of the rake-apron, and from thence passing upward in an inclined direction around the roller O, which has its bearings above the driving-wheel in upright frames or supports P at the front and rear of the machine. The aprons K M are each composed of two parts, the widest parts being at the rear, and the narrowest parts Q at the front of the machine. The narrow portion of the elevating-apron I prefer to make about ten inches wide, and the narrow portion of the rake-apron about half this width, or five inches. These proportions may be varied, however, as circumstances require. The parts Q of the two aprons pass around pulleys or rollers R, which have their bearings upon the journals of the rollers L N O. The upper roller R of the elevating-apron and the inner roller R of the rake-apron are of greater diameter than the rollers O L, but are fast to said rollers and rotate with them, while the lower roller R of the elevating-apron and the outer roller of the rake-apron are of less diameter than their respective rollers O L, and rotate independently thereof. By this arrangement the narrow parts of the aprons move at greater speed than the widest parts, so that the retarding action of the sickle and of the grain that is reeled down to be cut upon the butts of the grain already cut is counteracted. The butts of the grain are therefore fed to the elevating-apron as fast as the heads, this position being preserved upon the elevating-apron by the increased speed of its narrow parts, thereby delivering the cut grain evenly to the binder's tables. This improvement is of much value, for the following reasons, to wit: In those machines which employ a single elevating and a single rake-apron, or each of these made in several strips, moving at the same rate of speed, the grain, as it is reeled down to the sickle to be cut, acts upon that already cut, and retards its movement to such an extent that the stalks are turned upon the apron and delivered in a tangled mass to the binder's tables. In short grain this evil is aggravated to such an extent that frequently, in being carried up by the elevating-apron, the grain is moved to the front of the latter and falls over upon the ground. By the arrangement of a small and large roller, R, at the proximate ends of the two narrow aprons, the uniform width of the space between the wider parts of the same is preserved, to permit the free passage of the carrying-pins and slats which are affixed to said aprons. S are angular strips or slats affixed transversely to the rake-apron, to move the grain forward; and T are the carrying-pins upon the elevating-apron, which move between guide-strips U, placed above the same, from the rake-apron to and over the upper end of the elevating-apron, where they are united to a concave grain-receiver, V, above the driving-wheel.

W is a quadrangular or rectangular frame, composed of the wide strips X, secured at right angles to cross-bars Y near the ends of the latter. This frame is placed upon the grain-platform between the sides of the endless apron, the ends of the cross-bars Y resting in or upon the finger-bar and the bar in the rear of the platform, so that the strips X shall hold up or support the rear edge of the wide apron and the proximate edges of the wide and narrow apron, and also prevent the escape of grain between the latter. The frame W is adapted for removal, and may be taken off or applied without removing or disturbing the rake-apron. The finger-bar E of the machine is arranged in rear of the front bar E' of the frame, connecting the two by the angle-iron Z, as shown in Fig. 5. By this arrangement the sickle is placed and operated on a line with the front edge of the elevating-apron, or in rear thereof, so that the butts of the cut grain falling upon the sickle-back are delivered to the elevating-apron at some distance from its edge, and consequently cannot scatter nor come in contact with the guide-board. In fact, the latter is not required. Motion is communicated to the endless aprons from the crank-wheel H by means of a chain, A', passing over the same and around the pulleys or wheels B' C', mounted, respectively, upon the rear end of the inner roller-shaft L and the roller-shaft O. Each of these wheels is provided with peripheral pins, which enter the links of the chain as they are rotated, and with side flanges to prevent the lateral displacement of the chain. D' are angular projections, secured to the sickle-back at regular intervals, and inclining in opposite directions from the center or angle. That portion of each which inclines toward the grain-wheel occupies a position parallel or nearly so the back edge of the sickle, while the opposite inclination is diagonally toward the cutting-edges. The projections thus constructed are designed to clear the butts of the cut grain from the fingers or guards, and to feed them backward to the rake-apron as the sickle is operated. As the sickle moves to the right the diagonal inclinations pass under the grain, clearing it from the fingers and directing it to the rear. The return movement carries the opposite inclinations under the grain and lifts it from the fingers without carrying it to the left. F' is the binder's platform, constructed with a raised flange around its edges, and hinged to the end bar of the main frame beneath the concave V by means of transverse bars G' and brackets H', secured to said frame. The bars are firmly secured to the under side of the platform, and their inner ends, after passing the pivots of the brackets, extend beneath the main portion thereof, against which they bear to hold the platform in a horizontal or working position. They also permit it to be turned up out of the way in passing an obstruction, or through a narrow gateway, as shown by dotted lines in Fig. 2. I' are the binders' tables, each constructed in the form of an oval, or made rectangular with the corners rounded off, and provided with a wide flange extending around its outer side and inner end, as shown in Fig. 1. J' are uprights, mounted upon the corners of the main frame at opposite ends of the concave, and in their upper ends are stepped short pins or studs $k'$, projecting from the under side of the tables at their inner corners. L' are brace-rods, secured at one end to the outer ends of the tables, and fitting, by loops M', over the uprights J'. By this method of attachment the tables are permitted to turn freely upon the uprights, and may be swung round out of the way, as shown by dotted lines, Fig. 1, in passing an obstacle. They are held in the proper position for use by means of eyes at their inner edges, which receive pins $o'$ upon the ends of the concave, shown clearly in Fig. 3.

In the operation of the machine the binders stand upon the platform, and as fast as the grain is delivered to the concave remove it to the tables for binding. The wide flanges upon the latter prevent the bundles from being displaced by the movements of the machine while they are being bound, and also direct the shelled grain into the platform, where it is retained by the flanges of the latter until a considerable quantity is accumulated. By this means very little grain is allowed to escape from the machine.

Having thus described my invention, what I claim as new is—

1. The combination of the endless rake-apron with the elevating-apron of a harvester, each composed of two or more parts moving parallel to each other, the front part of each moving at a greater speed than the rear parts, substantially as described, for the purpose specified.

2. In combination with the grain-platform and the compound rake-apron, the removable frame W, substantially as described, for the purpose specified.

3. In combination with the sickle, the double-inclined angular projections D′, arranged as described, for the purpose specified.

4. The arrangement of the laterally-swinging binder's tables I′ at each end of the concave Y, and of the hinged platform F′, as herein described, for the purpose specified.

5. The binder's tables I′, constructed as described, and hung upon uprights J′ at each end of the concave by means of the socketed studs K′ and brace-rods L, substantially as described, for the purpose specified.

ELI B. RICE.

Witnesses:
N. K. ELLSWORTH,
E. A. ELLSWORTH. (74)